US010638418B2

United States Patent
Miramonti et al.

(10) Patent No.: US 10,638,418 B2
(45) Date of Patent: Apr. 28, 2020

(54) METHOD AND APPARATUS FOR DATA TRANSFER CONNECTION MANAGEMENT

(71) Applicant: FORD GLOBAL TECHNOLOGIES, LLC, Dearborn, MI (US)

(72) Inventors: Allan Miramonti, Westland, MI (US); Aziz Makkiya, Troy, MI (US); Rajesh Balaji Vijayan, Dearborn Heights, MI (US); Tony Zakaria, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/343,729

(22) Filed: Nov. 4, 2016

(65) Prior Publication Data
US 2018/0132173 A1    May 10, 2018

(51) Int. Cl.
| H04W 48/20 | (2009.01) |
| --- | --- |
| H04W 4/46 | (2018.01) |
| H04W 48/18 | (2009.01) |
| H04W 76/14 | (2018.01) |
| H04W 4/00 | (2018.01) |
| H04W 4/80 | (2018.01) |
| H04W 84/00 | (2009.01) |

(52) U.S. Cl.
CPC ............. *H04W 48/20* (2013.01); *H04W 4/46* (2018.02); *H04W 48/18* (2013.01); *H04W 76/14* (2018.02); *H04W 4/00* (2013.01); *H04W 4/80* (2018.02); *H04W 84/005* (2013.01)

(58) Field of Classification Search
CPC ....... H04W 4/80; H04W 12/06; H04W 12/08; H04W 43/16; H04W 48/18; H04W 48/20; H04W 72/0486; H04W 72/1247; H04W 76/02; H04W 76/023; H04W 76/10; H04W 76/14; H04W 76/18; H04W 76/19; H04W 76/23; H04W 76/34; H04W 84/005; H04W 92/04; H04W 4/00; H04W 4/46; H04L 12/26; H04L 29/06027; H04L 29/08; H04L 63/0876; H04L 63/102; H04B 1/205; H04B 17/318; H04M 1/6066; H04M 1/6091; H04M 2250/02; G06F 15/16; G07C 5/008; B65H 33/04
See application file for complete search history.

(56) References Cited

U.S. PATENT DOCUMENTS

| 5,226,071 | A  | * | 7/1993 | Bolliger | H04W 28/14 455/435.3 |
| --- | --- | --- | --- | --- | --- |
| 7,082,300 | B1 | * | 7/2006 | Link, II | H04W 8/26 379/114.01 |
| 8,107,430 | B1 | * | 1/2012 | Sarkar | H04W 72/10 370/329 |
| 8,989,954 | B1 | * | 3/2015 | Addepalli | H04W 4/046 701/32.3 |

(Continued)

*Primary Examiner* — Kashif Siddiqui
(74) *Attorney, Agent, or Firm* — Michael Spenner; Brooks Kushman P.C.

(57) ABSTRACT

A system includes a processor configured to receive a data transfer request including a priority designation. The processor is also configured to determine whether a wireless connection, having a predefined characteristic associated with the priority designation, is available. The processor is further configured to handle the request using the connection, if available and queue the request for later handling if the connection is not available.

12 Claims, 12 Drawing Sheets

(56) References Cited

U.S. PATENT DOCUMENTS

| | | | |
|---|---|---|---|
| 2003/0083041 A1* | 5/2003 | Kumar | H04M 15/00 455/406 |
| 2005/0060364 A1 | 3/2005 | Kushwaha et al. | |
| 2005/0135396 A1* | 6/2005 | McDaniel | H04L 29/06 370/412 |
| 2005/0266801 A1* | 12/2005 | Mathews | H04B 1/205 455/66.1 |
| 2007/0057426 A1 | 3/2007 | Goyal et al. | |
| 2007/0244832 A1* | 10/2007 | Koskinen | G06Q 20/102 705/68 |
| 2008/0225785 A1* | 9/2008 | Wang | H04W 74/002 370/329 |
| 2008/0242280 A1* | 10/2008 | Shapiro | H04N 21/25891 455/414.3 |
| 2009/0282161 A1 | 11/2009 | Mathur et al. | |
| 2010/0003958 A1* | 1/2010 | Ray | G10L 13/043 455/404.2 |
| 2010/0016008 A1* | 1/2010 | Brewer | H04W 4/10 455/518 |
| 2010/0227564 A1* | 9/2010 | Kaneko | H04B 5/02 455/66.1 |
| 2011/0151885 A1* | 6/2011 | Buyukkoc | H04W 72/1247 455/452.1 |
| 2011/0188444 A1* | 8/2011 | Borleske | G01D 4/004 370/315 |
| 2011/0196826 A1* | 8/2011 | Retief | G06Q 30/02 707/621 |
| 2012/0218909 A1* | 8/2012 | Yamaguchi | H04W 76/10 370/252 |
| 2013/0005263 A1* | 1/2013 | Sakata | H04W 76/18 455/41.2 |
| 2013/0084905 A1* | 4/2013 | Ehara | H04W 4/70 455/500 |
| 2013/0196621 A1* | 8/2013 | Guday | H04L 43/045 455/406 |
| 2013/0309991 A1* | 11/2013 | Shaw | H04W 76/36 455/404.1 |
| 2014/0011483 A1* | 1/2014 | Baumert | G07C 5/008 455/414.1 |
| 2014/0347984 A1* | 11/2014 | Speks | H04W 28/16 370/230 |
| 2016/0119291 A1* | 4/2016 | Zollinger | H04L 9/3228 713/171 |
| 2016/0249223 A1* | 8/2016 | Egner | H04W 16/14 |
| 2016/0262191 A1* | 9/2016 | Flynn | H04W 76/10 |
| 2016/0277773 A1* | 9/2016 | Ho | H04N 21/26258 |
| 2016/0277878 A1* | 9/2016 | Lee | H04W 4/008 |
| 2016/0381717 A1* | 12/2016 | Sunagar | H04B 17/318 370/328 |
| 2017/0161973 A1* | 6/2017 | Katta | G06Q 40/08 |
| 2017/0180922 A1* | 6/2017 | Nishi | H04W 76/18 |
| 2017/0195325 A1* | 7/2017 | Yamamoto | H04L 63/0876 |
| 2017/0353609 A1* | 12/2017 | Huang | H04M 15/39 |
| 2018/0007590 A1* | 1/2018 | Karout | H04W 76/10 |

\* cited by examiner

METHOD AND APPARATUS FOR DATA TRANSFER CONNECTION MANAGEMENT

TECHNICAL FIELD

The illustrative embodiments generally relate to a method and apparatus for data transfer connection management.

BACKGROUND

Modern vehicles utilize a vast variety of data services, ranging from onboard computing systems to remote data reporting and access. Vehicle telematics units provide the ability to communicate with remote networks, and these communication services can be used to update firmware and software, obtain media, and even can be used to send email from the vehicle and manage phone calls.

Transfer of data to and from remote networks requires some form of connection that can access and communicate with a remote network. A common solution to this need is to use a cellular network. Cellular networks, however, often come with a cost associated with data transfer. While the cost may be nominal for a single transaction, if an original equipment manufacturer (OEM) is incurring the cost for OEM-specified transactions, such as diagnostics and software updates, the cost can be significant when aggregated over all the vehicles on the road.

Using Wi-Fi or other similar inexpensive or free services can result in data savings, but data transfer under such conditions may require frequent restarts because a vehicle tends to move around, which means the vehicle will be unlikely to stay in the range of any particular connection for a prolonged period of time. Also, such services may only be available at select time periods or locations, which makes them an unreliable choice for a sole means of data transfer.

SUMMARY

In a first illustrative embodiment, a system includes a processor configured to receive a data transfer request including a priority designation. The processor is also configured to determine whether a wireless connection, having a predefined characteristic associated with the priority designation, is available. The processor is further configured to handle the request using the connection, if available and queue the request for later handling if the connection is not available.

In a second illustrative embodiment, a system includes a processor configured to receive a data transfer request, including a priority designation, from an application executing on a first vehicle module including the processor. The system is also configured to query an interface monitoring process of a second vehicle module to determine if the second vehicle module has an available wireless connection having a predefined characteristic associated with the priority designation. The system is additionally configured to instruct the second vehicle module to handle the request using the connection, if available and queue the request for later handling if the connection is not available.

In a third illustrative embodiment, a system includes a processor configured to receive a data transfer request including a free-only designation and an expiration designation. The processor is also configured to determine whether a wireless connection, having free data transfer, becomes available for use in handling the request during a time period defined by the expiration designation. The processor is additionally configured to handle the request using the connection, if the connection becomes available and redesignate the request as a non-free request, to be handled by a non-free available connection, once an amount of time defined by the expiration designation passes and the request has not yet been handled.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
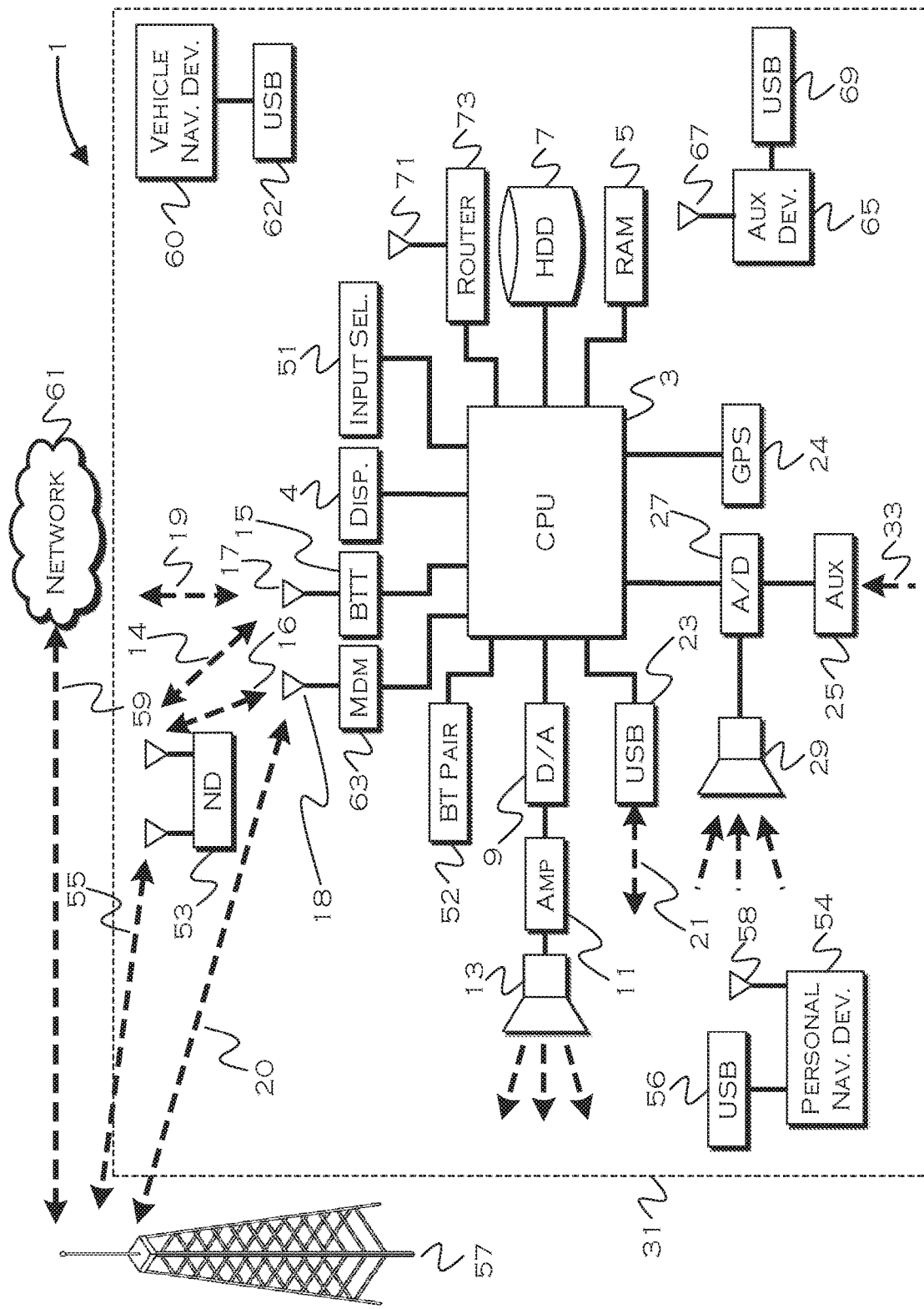
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Many vehicular telematics units utilize data in an unoptimized and expensive fashion. Essentially, these units perform data transfers on-demand, using whatever connection resources happen to be available at the time. In some instances, the systems do not even use the most cost effective or fastest available resources, instead sticking with a pure cellular model.

While cellular data services are cheap on a per-instance basis, in the aggregate they are quite expensive and are often not the fastest available connection. With more and more free wireless hotspots popping up around the country, and with the planned deployment of millions of DSRC hotspots in a road-network infrastructure, there are already a large number of available alternatives to cellular networks for data transfer.

Also, most users have a home wireless network, and since data transferred over this network is (at least for now) free, regardless of volume, these home networks represent a valuable resource in the data transfer option pool. Advantages of cellular are that it provides wide ranging and consistent coverage, and that an OEM does not have to ask anyone, including a driver, for permission to use the network, if the OEM is paying the subscription cost. It is unlikely, however, that many drivers will object to their own personal vehicles using their own personal networks to transfer data, especially when that data is designed to improve the vehicle (such as OTA updates).

In the illustrative embodiments, an onboard connection manager handles onboard application data transfer requests. The connection manager also handles failing over between data transfer options, finding options with sufficient bandwidth and latency (based on request specified or pre-specified parameters). Further, the illustrative connection manager handles requests designated as "free only" or "preferably free," such as non-time-sensitive requests.

An application can identify a priority ranking, which the connection manager can use to determine which interfaces to use to process the request, and when the request needs to be processed. For example, high priority requests could use the lowest latency interface, and execute immediately using any available interface. Medium priority requests might use the highest bandwidth interface, and again execute immediately. Low priority requests might use the highest available bandwidth connection that is also below a certain cost, delaying executing for at least a predetermined time period if needed, until a cost-effective connection becomes available.

Some requests might also be designated as "free only" or "free preferred," indicating that the request should be delayed until such time as a free transfer connection is available. These requests may also have a designated timeout associated therewith, or predefined, which specifies that the request will be processed by any or designated available non-free interfaces, if a free interface does not become available before the time period expires. Other requests might be designated "off peak" or "night only," which will delay the request until off-peak or nighttime transfer (presumably at a lower cost) is available. In this instance, the connection manager might wake the TCU in off-peak or night hours to perform the request, if the vehicle is not already in use at the necessary time.

Figure 2A:
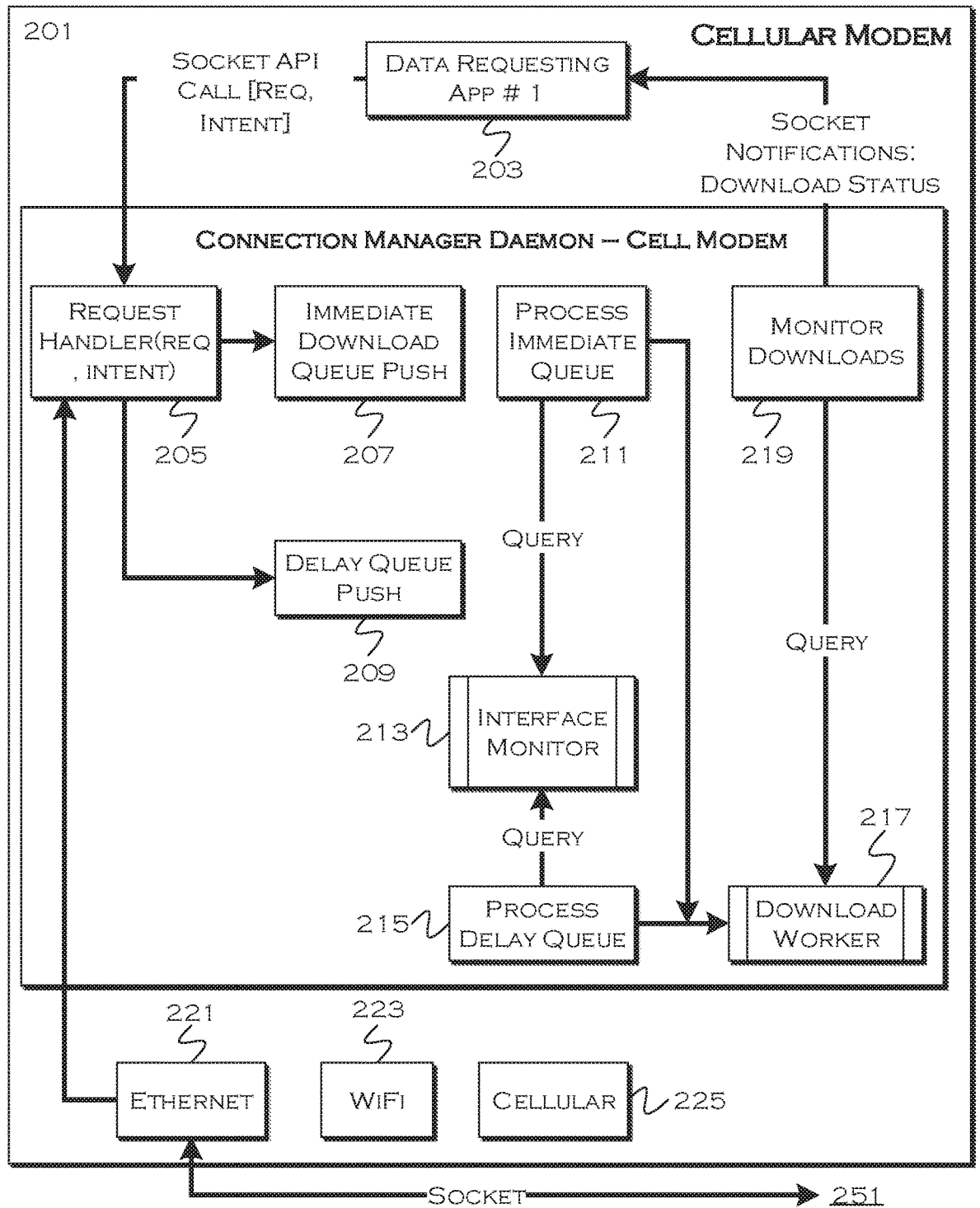
FIGS. 2A and 2B show an illustrative system for data connection management.
Figure 2B:
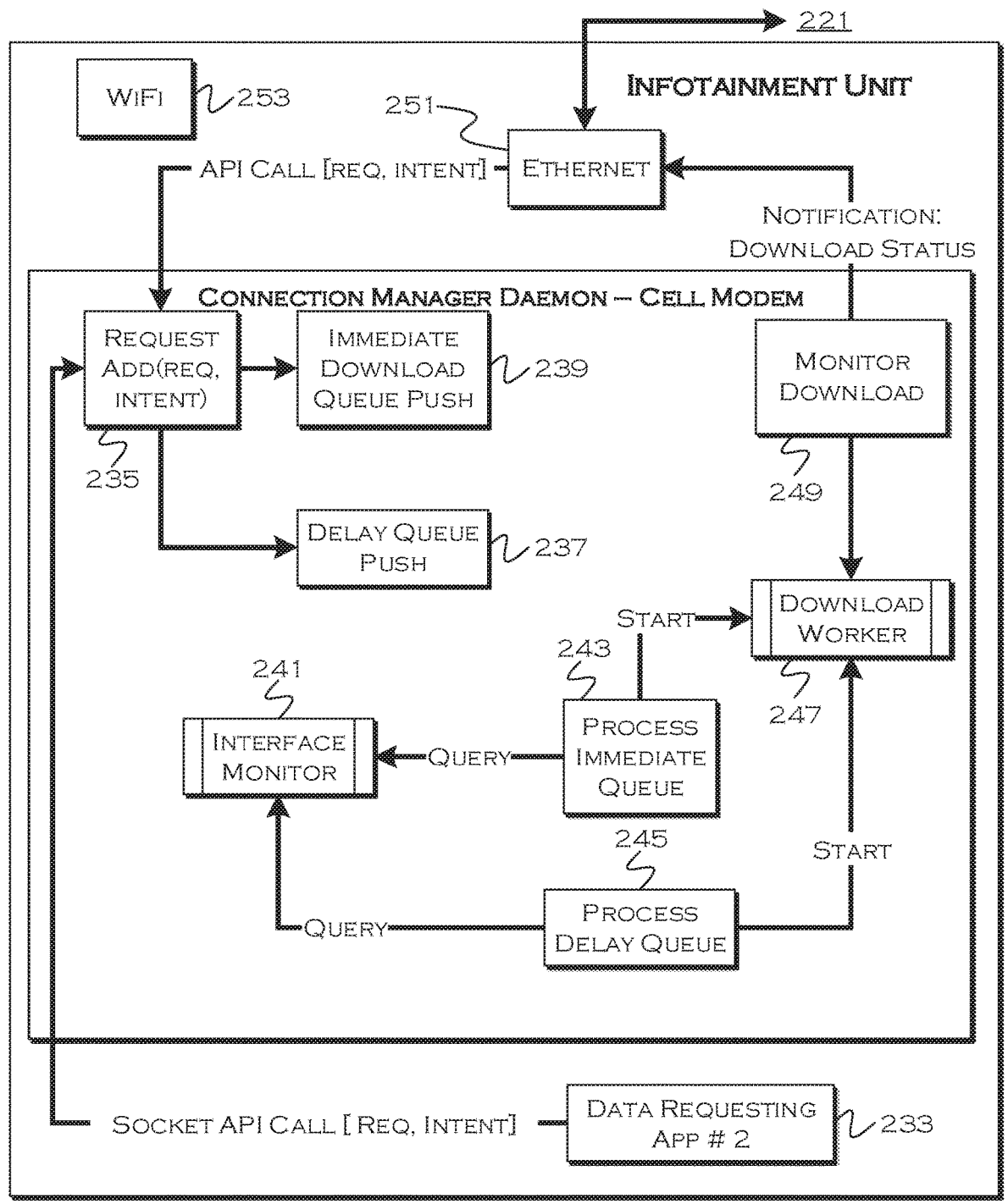

FIGS. 2A and 2B show an illustrative system for data connection management. In this illustrative example, the system includes a cellular modem 201 and an infotainment unit 231. The cellular modem 201, shown in FIG. 2A, includes a cellular modem data connection manager daemon. An application executing on the vehicle or a vehicle electronic control unit (ECU) requests data transfer 203, and the process passes the request to a request handler 205. The request may include transfer requirements and/or a priority designation. In some cases, the priority designation may serve to specify the transfer requirements.

Depending on the type of transfer needed (immediate or delayed), the request handler may push the request to an immediate transfer queue 207 or may push the request to a delay queue, which may delay request handling until an appropriate time (specified by the parameter(s) or priority associated with the request).

The connection manager may also process the immediate transfer queue 211, which can result in handling of some or all of the requests in the immediate transfer queue, depending on the results from a query of available interfaces 213. Since certain requests may specify a particular latency or bandwidth, those requests may not be handled unless an interface having sufficient characteristics to meet the parameters exists.

A similar paradigm may be followed for handling the delay request queue 215, which may have different interface requirements associated with the requests stored therein, but will similarly delay or handle requests based on the characteristics of available interfaces compared to the constraints associated with the requests.

Once the connection manager determines that request handling is appropriate under the current conditions for a given request, the process may assign a transfer worker process 217 to handle the transfer. A monitoring process can monitor the request handling by the workers 219, and handle any failover that may occur due to loss of a particular connection or interface availability or characteristic change.

In this example, the cellular modem has Wi-Fi 223 and cellular 225 options for use in data transfer handling, as well as an Ethernet connection 221 to handle transfer requests from another module such as the infotainment unit 231.

FIG. 2B shows the infotainment unit 231, which also includes an Ethernet connection 251 to pass requests to other modules and/or receive transfer requests from other modules.

In this illustrative embodiment, another application 233 requests data transfer through the infotainment unit. The infotainment connection manager includes a request handler 235, which can also pass requests to the cellular modem if the infotainment unit lacks a consistent connection (such as cellular) for immediately handling higher priority requests.

If the request requires immediate processing, based on parameters associated with the request, including priority ranking, the infotainment connection manager may push the request to an immediate download queue 239. This immediate download queue may be serviced, at least in part, by a cellular connection provided by the cellular modem, and/or the request handler may push immediate requests to the cellular request handler process if no immediate connection is available for servicing an immediate download queue on the infotainment unit. Additionally or alternatively, when the infotainment unit attempts to handle the immediate download queue requests, the process may determine pass some or all immediate transfer requests to the cellular modem unit, if the process fails to handle the requests using interfaces available to the infotainment unit.

For requests that request delayed processing (e.g., night time or free only requests), the process may push those requests to the delay queue 237. As with the immediate queue on the infotainment unit module, the process may push delay queue requests to the cellular modem module at an appropriate time, if the delay queue does not have access to an appropriate interface for handling the request (e.g., without limitation, no Wi-Fi network connection for handling free-only requests, or no cellular connection or Wi-Fi connection for handling night-time requests). The process can determine interface availability for use by each queue by queries to the infotainment interface monitor 241.

For any requests where an interface that meets request constraints is available, the process can initiate a transfer worker 247 and monitor the transfer 249 in case failover is needed due to loss of connection or connection state change (e.g., transition from free to cost-based, night to day, etc.).

Various different vehicle modules may have independent communication capability, which can include, for example, access to a module-provided modem or Wi-Fi transceiver, or other wireless communication components provided to and for use by that particular module. The illustrative embodiments allow alternative modules on a vehicle network to use the communication capabilities of other modules.

Figure 3:
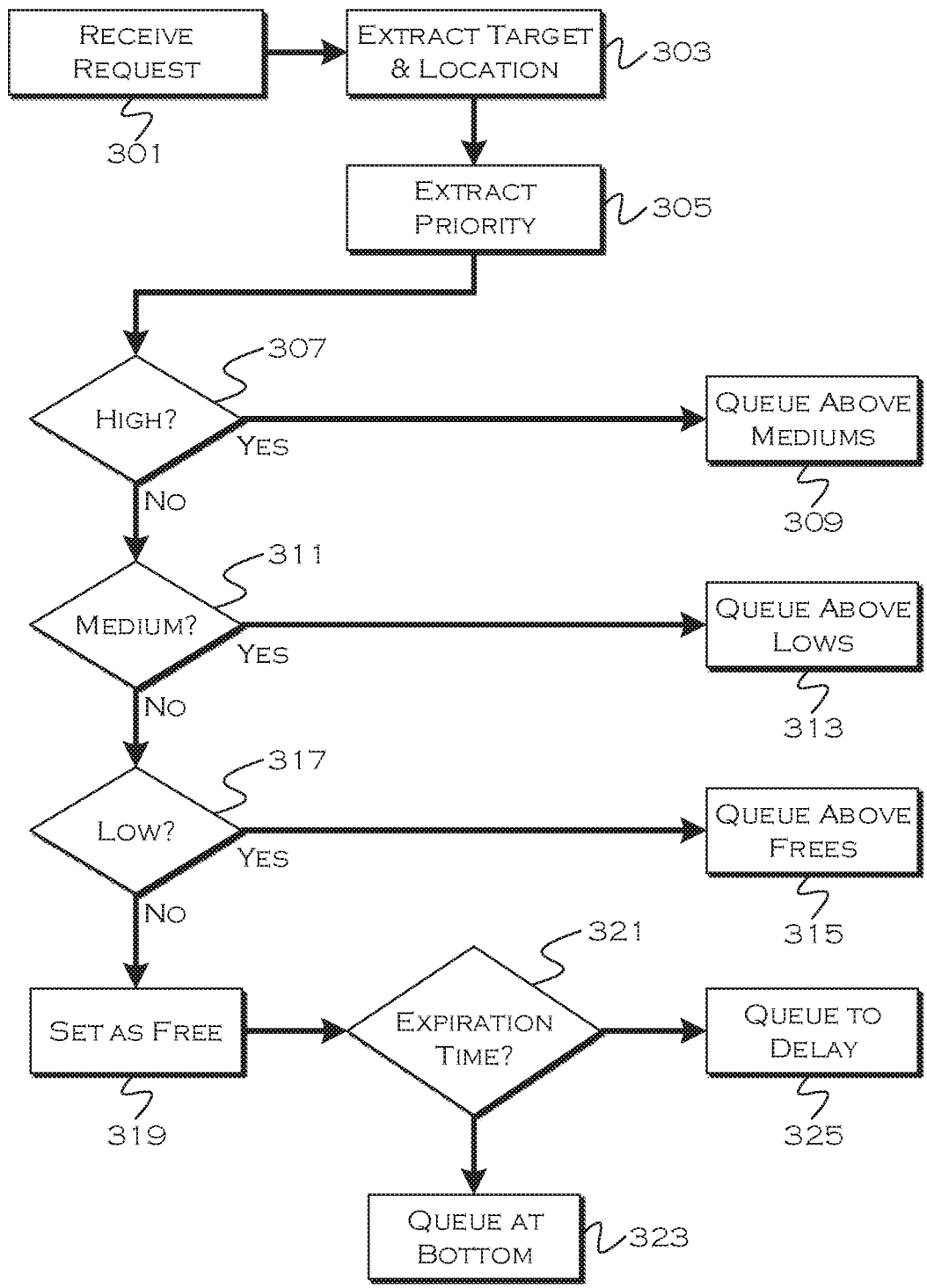
FIG. 3 shows an illustrative process for data transfer request handling.

FIG. 3 shows an illustrative process for data transfer request handling. In this illustrative example, a request handling process receives a request for data transfer from an onboard application 301. The request may include a target system to provide/receive the transfer and a local file name for storage/access of a transfer. The process extracts these parameters from the request 303, as well as a request priority designation 305.

The process can place the request in an immediate download queue based on a priority ranking, if a single immediate download queue is used. In an alternative example, multiple queues may be used, with the process moving to a lower priority queue if and when any higher priority queues are empty. In this example, the process uses an immediate download queue and a delay queue. The delay queue holds free only requests that also have a delay associated therewith, which can be requeued to the immediate download queue for execution by the cellular connection, if no free data transfer interface becomes available during the delay period.

In this example, if the request is a high priority request 307, the process queues the request above the topmost medium priority request 309. If the request is a medium priority request 311, the process queues the request above the topmost low priority request 313. If the request is a low priority request 317, the process queues the request above the topmost free only request 315. This achieves a first in first out ordering of requests, with priority ranking providing higher processing priority for a request. Other models can also be used, this is merely an illustrative method for queuing.

Other remaining requests are set as free-only requests 319, since in this example the request is one of high, medium, low or free only priority. If the free only request has an expiration time for the free only period 321, the process queues the request to a delay queue. The delay queue preserves free only requests for a defined time period (which can be defined for all requests as a group or individually) and then the process moves free only requests to the immediate transfer queue for processing by a cellular interface when available. The process places free only requests with no expiration period at the bottom of the immediate handling queue.

Figure 4:
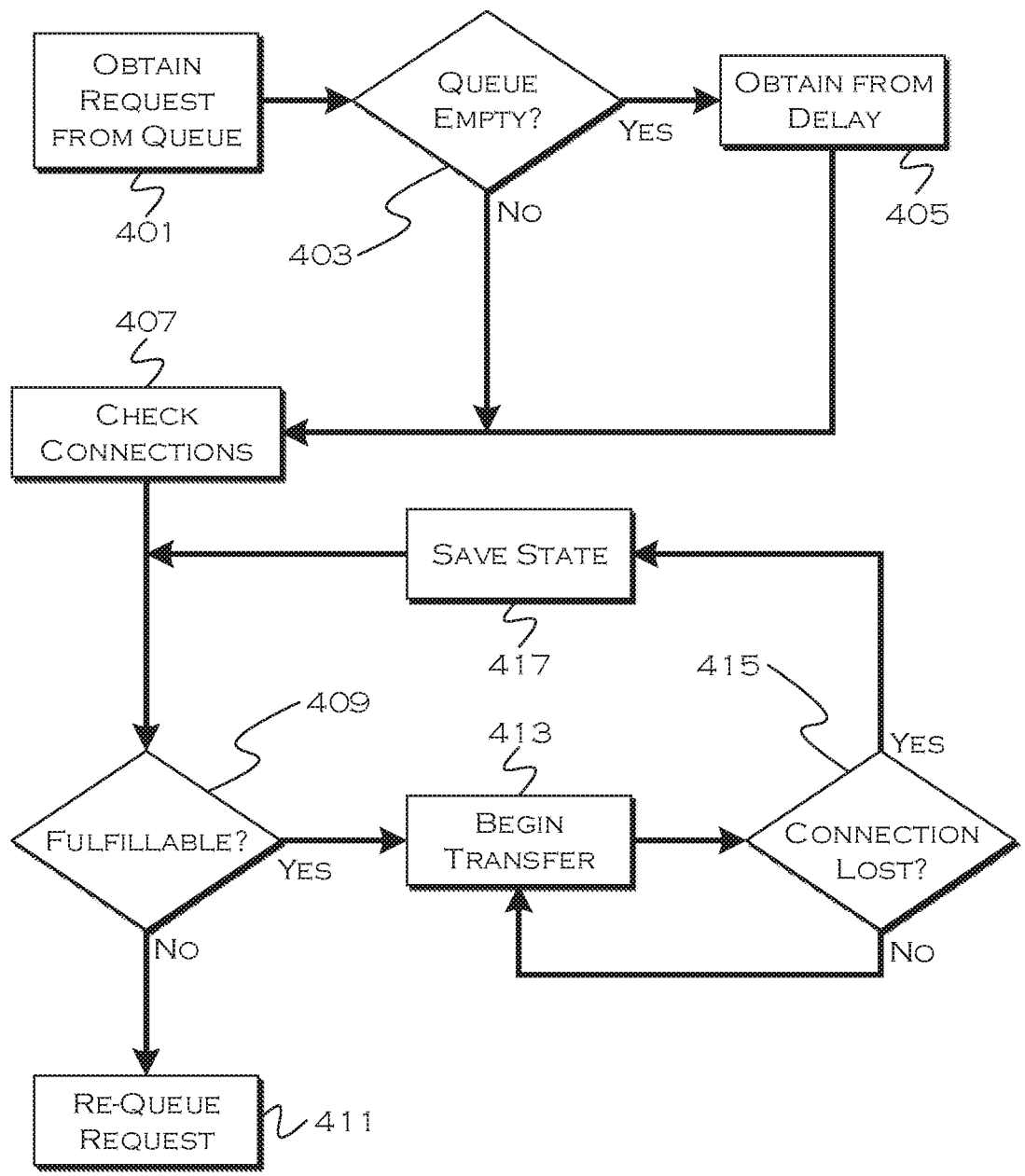
FIG. 4 shows an illustrative data transfer process.

FIG. 4 shows an illustrative data transfer process. In this example, the process obtains a request from the immediate handling queue 401. If the immediate handling queue is empty 403, the process may retrieve a request from the delay handling queue 405, holding free only requests with a defined expiration time period.

The process then queries available connection interfaces 407, to determine if the request can be fulfilled using the parameters and/or constraints associated with the request 407. If the request is fulfillable under the associated constraints, the process begins transfer 413 according to the request, using an interface meeting the constraints. If the connection is lost at some point 415, the process may save a state of the transfer 417 and check for another available interface that meets the constraints 409. If no interface is available, the process may requeue the request 411 and move to a next-request in the queue.

At any time when the process attempts data transfer handling, which could be ongoing with some level of consistency, the requests are handled in an ordered fashion, with the highest priority request having constraints meetable by currently available connection interfaces being handled first. Other models can also be employed for request handling, and flags for certain interface availability can be set when a request is queued, so that the request handling occurs at least when a flagged interface becomes available.

Figure 5:
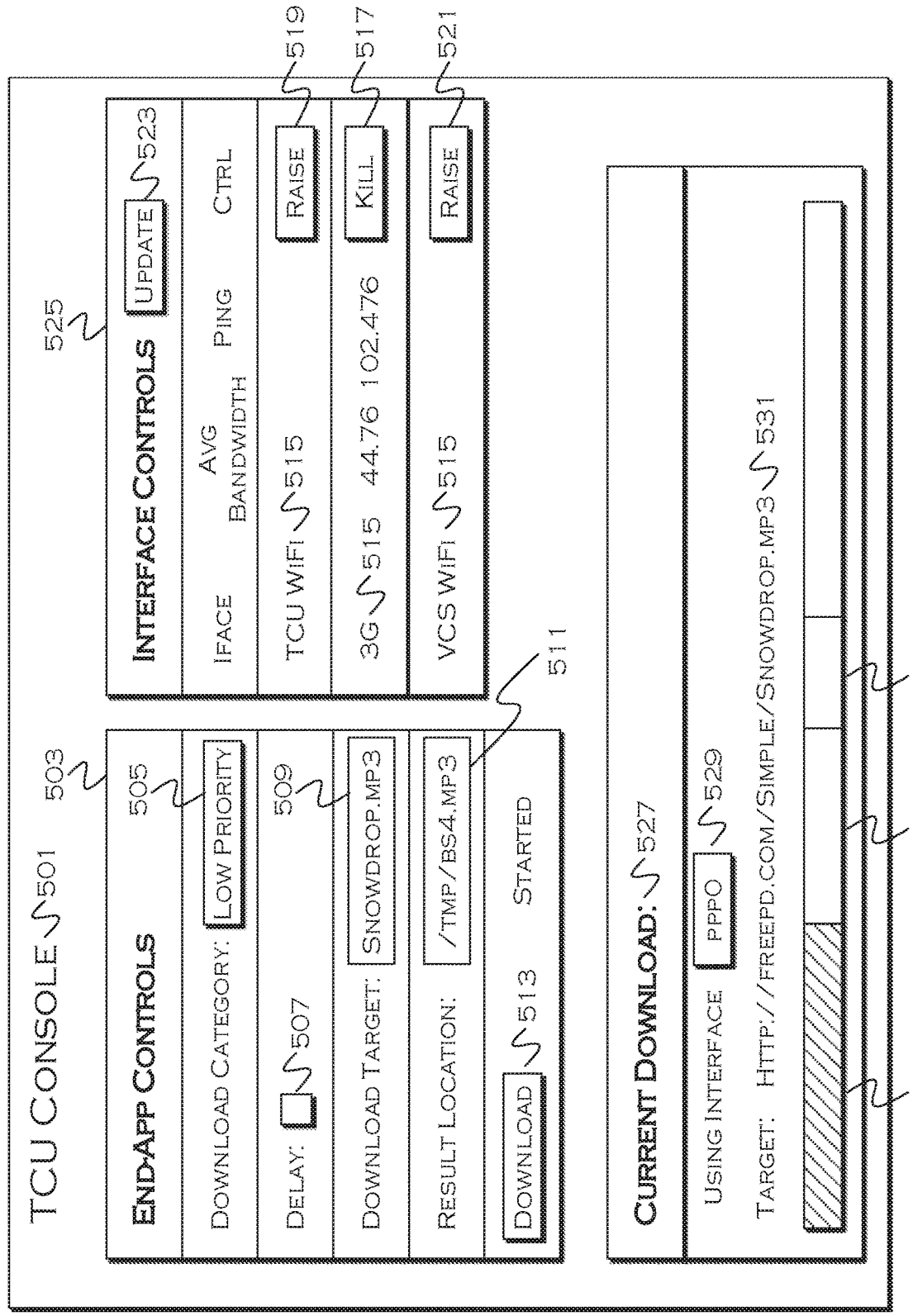
FIG. 5 shows an illustrative data transfer control interface.

FIG. 5 shows an illustrative data transfer control interface. OEMs could provide this interface to developers, or it could be a background interface accessible by those with knowledgeable diagnostic skills. Aspects of the interface could be viewable by drivers/occupants, but the driver or occupant may not be able to reprioritize a request, for example. If the interface is provided to drivers, for example, certain parameters may be controllable and other parameters may be fixedly defined (so that the driver does not misprioritize a request). Access to fixedly defined parameters may be obtained through an override procedure, if desired, so that all definable parameters may be changed by a qualified party. In some instances, the driver may never be able to see or utilize this interface, and it can be reserved for OEM/developers only.

The TCU console 501 provides a download category (or upload category) specifying the priority of the request 505. In this example, the process would allow for definition of high, medium, low, free only and/or night-time only specification of priority. Certain applications may also only have a limited definition set available, with high priority and/or medium priority reserved for vehicle critical and important functionality.

The console shows a target location 509, specifying where a file for transfer is obtained from. There is also a result location 511, specifying where a file for transfer is to be saved to. If a download has not yet started, a user can press a download button 513 to initiate the request.

Interface controls 525 provide a list of available connection interfaces, which can be updated 523 to reflect a present set of available connection interfaces. In this example, there are three available interfaces 515, a TCU Wi-Fi, a 3G cellular connection, and a VCS Wi-Fi connection. The 3G connection is currently handling the transfer, although this interface transfer can be killed 517 and either other available interface can be raised 519, 521 to handle the connection.

The TCU console also shows a current download 527. This information includes a current interface under use 529 (which is the 3G connection in this case). The console also shows the various amounts of data in the target file that have been downloaded by the various interfaces. Here, the TCU Wi-Fi has downloaded 11% of the file 535, the VCS Wi-Fi has downloaded 27% of the file, and the current cellular connection has downloaded 4% of the file.

Figure 6A:
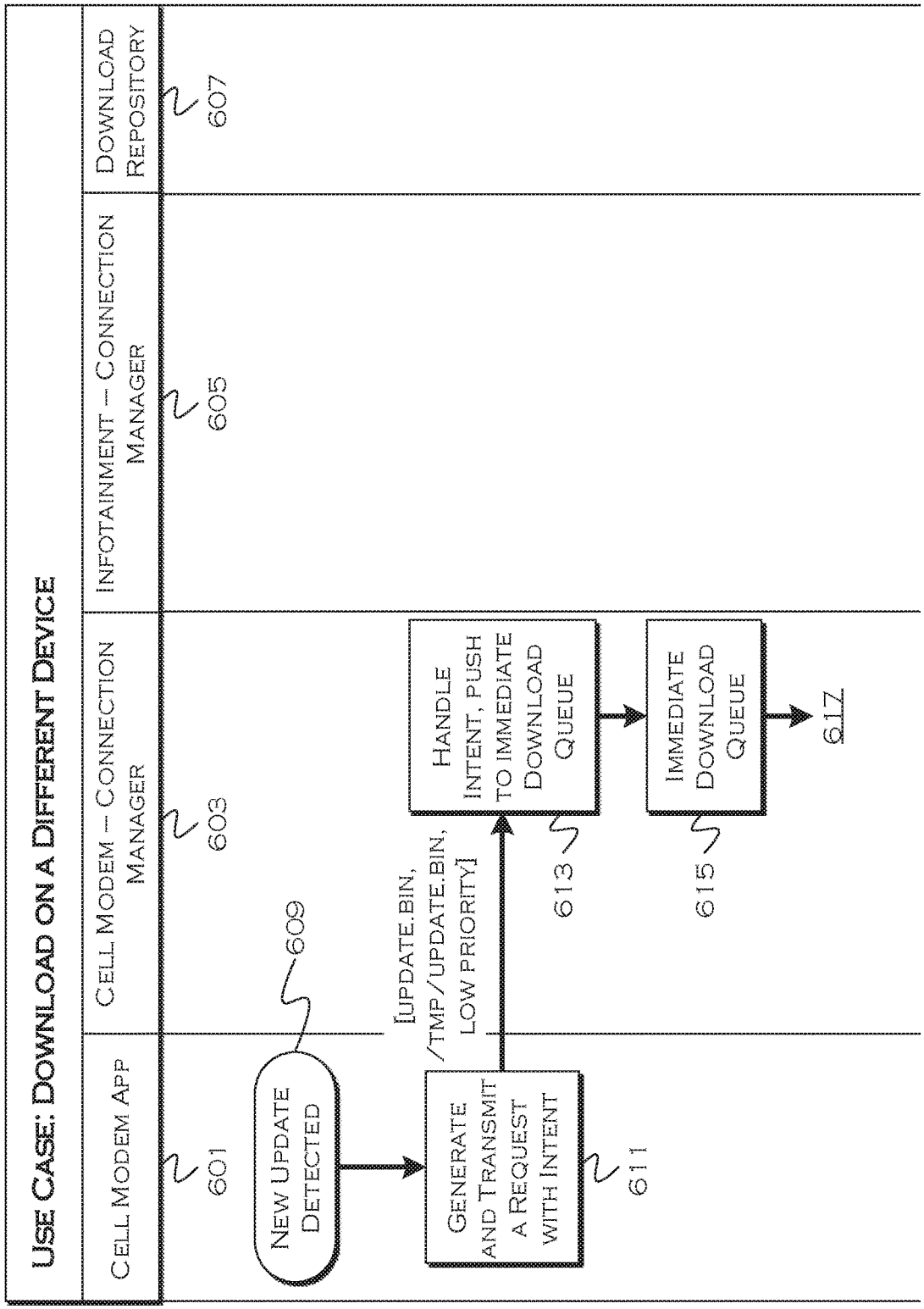
FIGS. 6A-6C show an illustrative data transfer process using a secondary device.
Figure 6B:
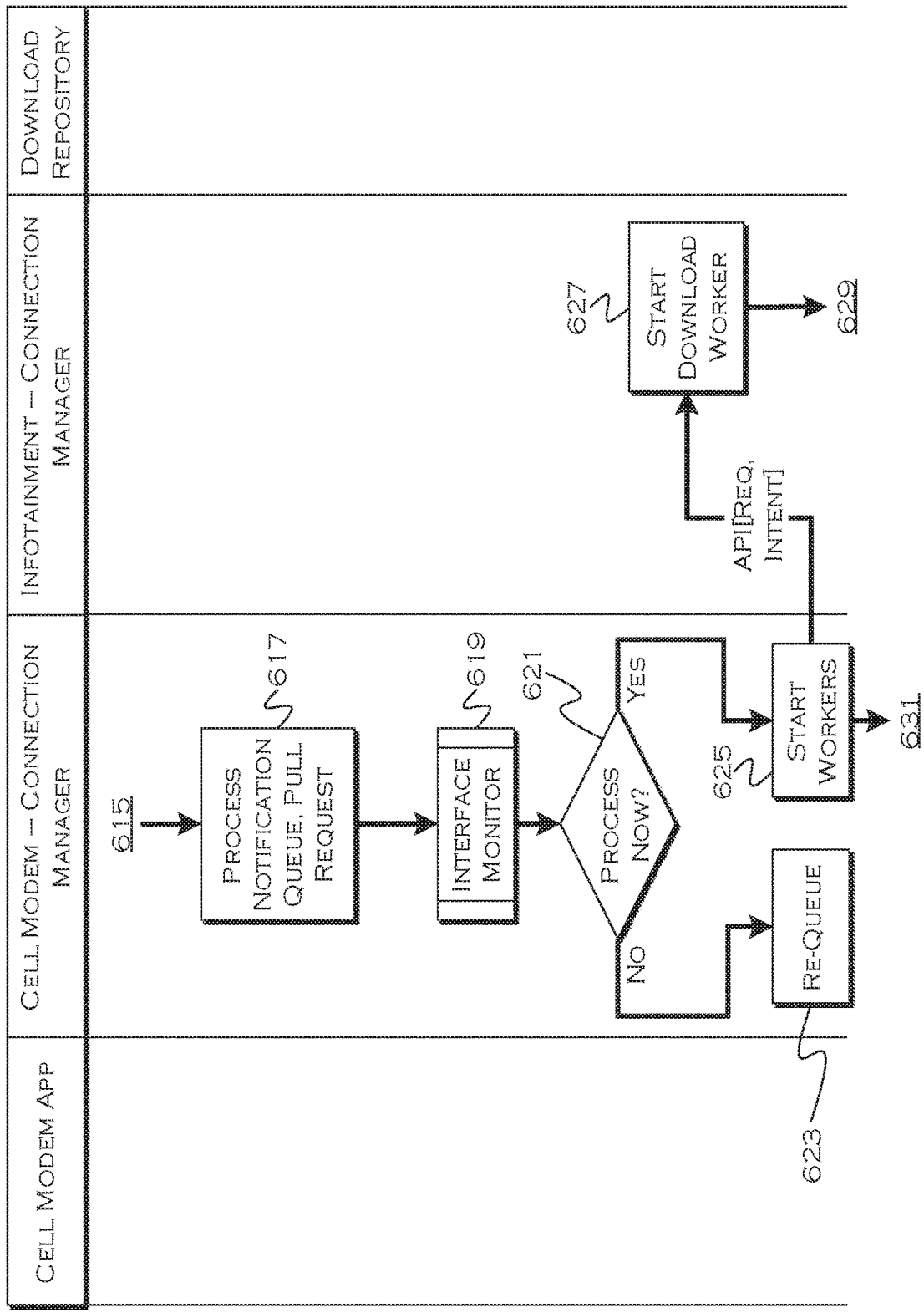
Figure 6C:
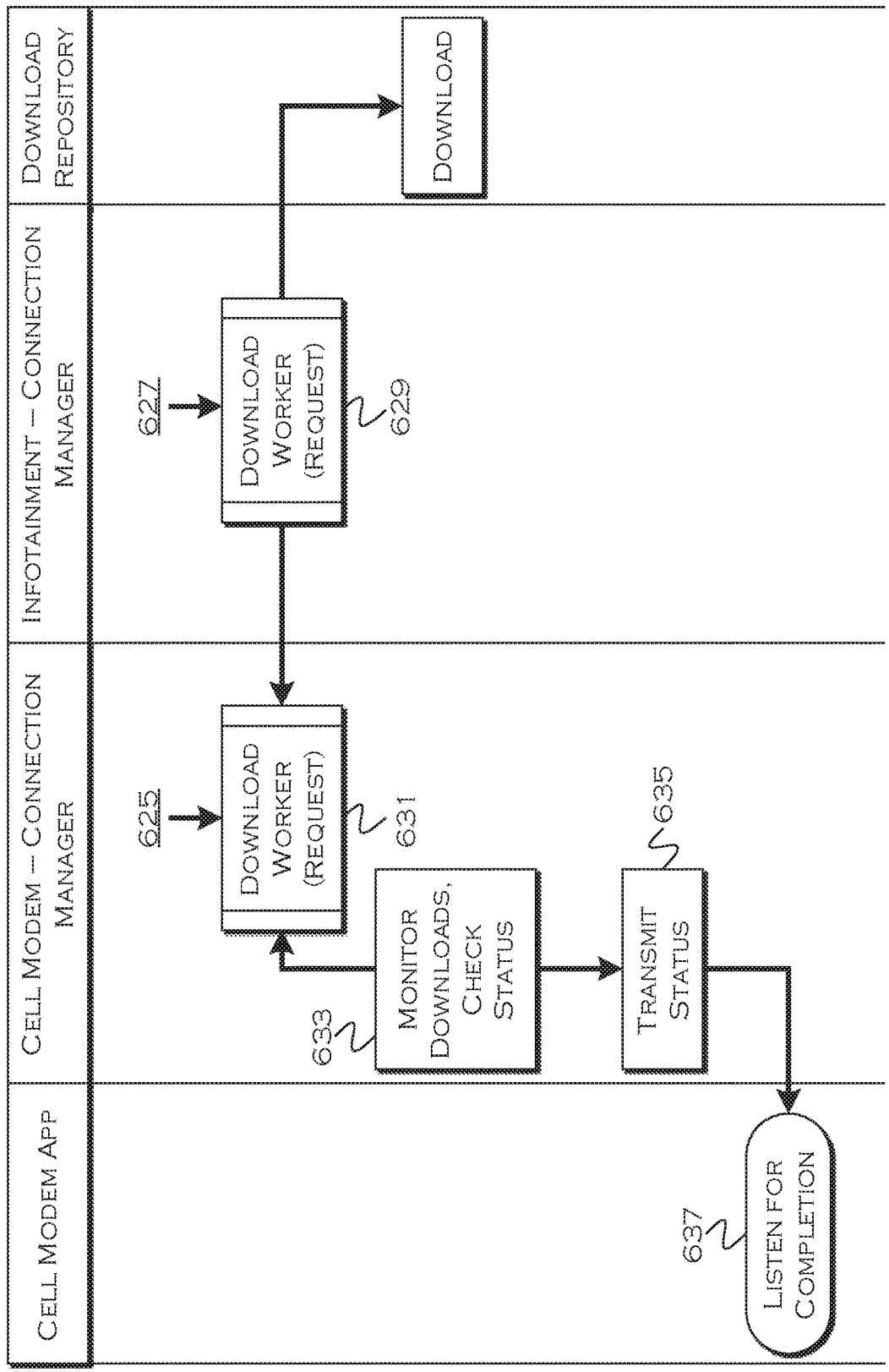

FIGS. 6A-6C show an illustrative data transfer process using a secondary device. In this illustrative example, the TCU module, which includes the cellular modem and a cellular modem application 601, wants to download a file, but will use a network interface provided by the infotainment system to process the download.

The cellular modem application detects a new software update that is available 609, or is informed through some form of messaging that a new update is available. Accordingly, the application generates and transmits a request for the update 611, which includes a priority ranking (low in this case).

Since the application is running on the TCU, the TCU connection manager 603 receives the application request initially 613. The connection manager pushes the request to the immediate download queue 615, in the appropriate position (e.g., below the medium and high priority requests). When queue handling occurs, the queue handling process pulls 617 the request from the immediate download queue and queries the cellular modem (TCU) interface monitor process 619.

The interface monitoring process keeps track of which network interfaces are currently available for a particular module. It may also know about interfaces available to other modules, and can be kept up to date with this alternative interface information through inter-module communication. In this example, the TCU interface monitor knows that the infotainment connection manager 605 has a Wi-Fi connection available for use in transfer.

In this example, if the request is not ready for handling 621, or if another parameter (e.g., night-only) of the request is not met, the process will requeue the request 623 and move to a next-request in the queue. If the request handling conditions are met, the process engages a worker to handle the request 625.

In this example, two workers are engaged, one on the TCU module to handle the data coming from the infotainment module, and one on the infotainment module to handle the actual download. A request passed to the infotainment connection manager can cause the infotainment connection manager to engage a download worker 627, which handles the download of the request 629 and retrieves the data to be downloaded from a download repository 607. The infotainment download worker passes relevant data to a TCU download worker 631.

A TCU download monitor process 633 can monitor any download workers running on the TCU. This allows for failover handling and notification and logging of errors, as well as requeueing of incomplete requests if no alternative request handling interface is available for failover. The TCU monitoring process may transmit an ongoing status of the request 635 (which may include, for example, completion state, interface currently engaged, etc). The application listens 637 for completion of the request from the status transmission.

Figure 7A:
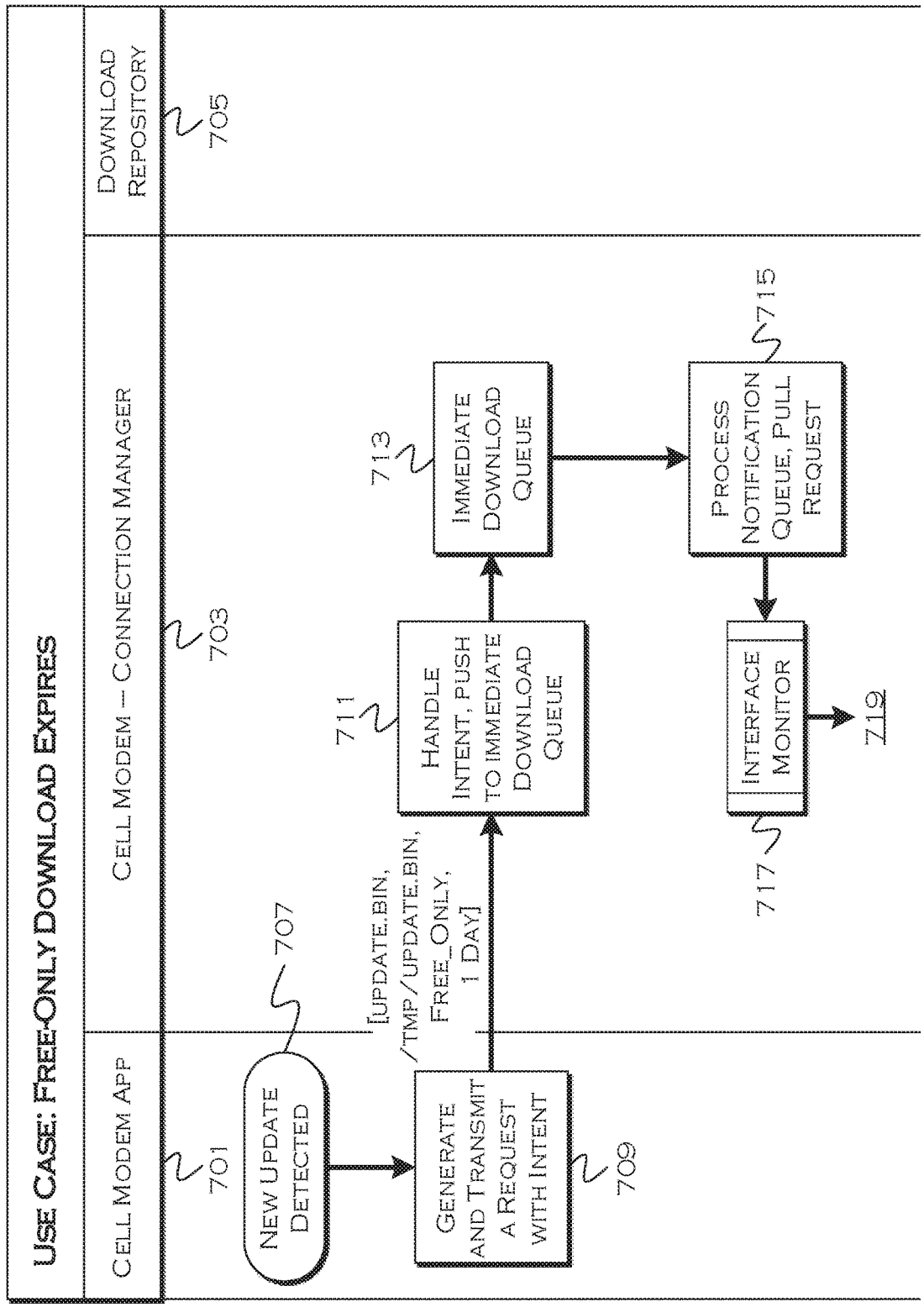
FIGS. 7A-7C show an illustrative data transfer process for facilitating a constrained data transfer.
Figure 7B:
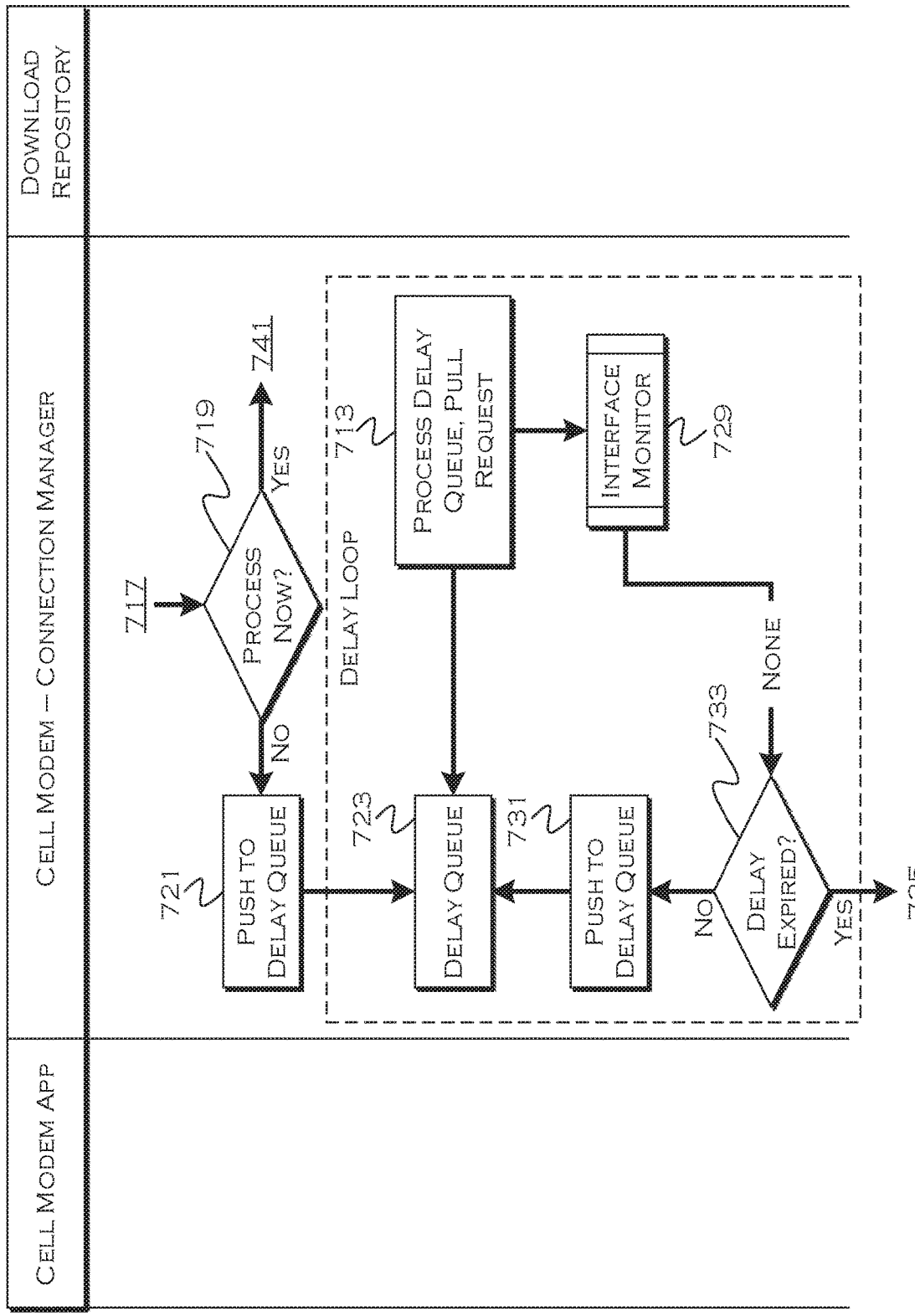
Figure 7C:
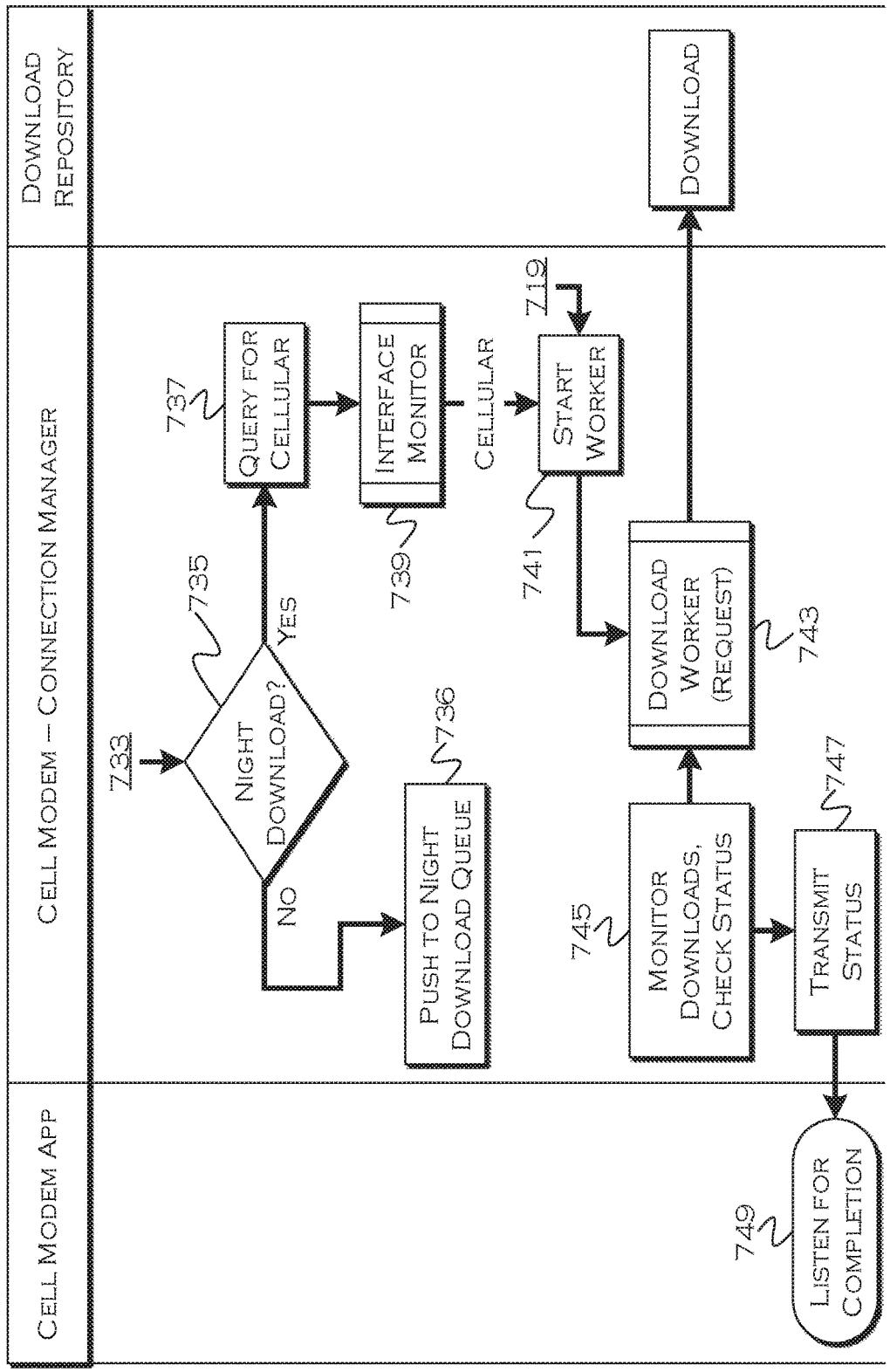

FIGS. 7A-7C show an illustrative data transfer process for facilitating a constrained data transfer. In this example, a request includes a free-only parameter, designating that only zero cost data transfer should be used to complete a requested transfer. The request also has an expiration timer associated therewith, the expiration timer designating a time period after which any or certain available connections may be used to complete the request. In some models, the entire delay queue (of free only requests including expiration timers) may have a fixed, predefined expiration time associated therewith (e.g., any request stays in the queue for five hours), and in other models the individual requests may have defined expiration timers associated therewith on a per-request basis.

An application 701 executing on the TCU module detects or is informed of a new update that is available 707. Again, the application generates a request for the update data 709. The application then passes this request to the TCU connection manager, and the request includes a priority, which in this case is "free-only." In this example, the request also includes an expiration parameter of 1 day.

In this example, the connection manager initially pushes the request to an immediate download queue 713 (for handling based on priority) in case a free connection is currently available. A queue handling process 715 pulls the request from the queue and queries the interface monitor 717 to determine if any free connections are available. In this example, there are no free connections available, so the request is not immediately processed 719. If a free connection were available, the connection manager queue handling process would engage a worker 741 to handle the request.

Since the request is not ready for immediate handling, the connection manager pushes the request 721 to a delay queue 723, where the requests with expiration times are processed. A delay queue handling process 725 pulls requests from the delay queue and queries the interface monitor 729 to determine if there is an available free cost interface for use in fulfilling the request(s). Whenever the delay queue handling process cannot fulfill a request, the process determines if any time remains on the expiration timer 733. If time remains, the process requeues the request in the delay queue, otherwise the process moves the request to an immediate queue for cellular handling.

It may also be the case that a particular request is designated as a night-only request, in which case the connection manager may queue the request in a night-only queue 736 or delay handling of the request until a specified hour. If the request is not a night only request, and if the delay timer has expired, the process will query for a cellular (or other usable) 737 interface from the interface monitor 739.

If the requested connection is not available, the request may be requeued in the appropriate queue (immediate or night-only, in this example). If a cellular (or other requested connection) is available, the process may initiate 741 a download worker 743. The download worker downloads the request from a download repository 705.

As before, a monitoring process 745 monitors the download and transmits any needed status updates 747 and/or handles or arranges for handling of failovers resulting from lost or changing connections. The application listens to the download monitor for completion of the requested download 749.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a data transfer request, the request including a priority designation that designates when the request is to be handle relative to other requests and includes a predefined characteristic defining what type of connection is permissible to use for handling the request;
determine whether a wireless connection, having the predefined characteristic, is available;
handle the request using the connection, it available;
queue the request for later handling if the connection is not available,
wherein the priority designation includes at least one of:
a high priority designation and the predefined characteristic is any available connection also having a lowest latency if a plurality of connections are available;
a medium priority designation and the predefined characteristic is any available connection also having a highest bandwidth if a plurality of connections are available;
a low priority designation and the predefined characteristic is any available connection for which transfer costs for handling the request will not exceed a predefined maximum cost, also having a highest bandwidth if a plurality of connections, for which transfer costs for handling the request will not exceed a predefined maximum cost, are available; or
a free-only designation and the predefined characteristic is any available connection for which there are no transfer costs for handling the request.

2. The system of claim 1, wherein the request also includes an expiration designation, Wherein the processor is configured to redesignate a free-only designated request to be handled by a non-free available connection if an amount of time defined by the expiration designation passes and the request has not yet been handled.

3. A system comprising:
a processor configured to:
receive a data transfer request, including a priority designation, which designates when the request is to be handle relative to other requests and includes a predefined characteristic defining what type of connection is permissible to use for handling the request, from an application executing on a first vehicle module including the processor;
query an interface monitoring process of a second vehicle module to determine if the second vehicle module has an available wireless connection having the predefined characteristic;
instruct the second vehicle module to handle the request using the connection, if available; and
queue the request for later handling if the connection is not available.

4. The system of claim 3, wherein the priority designation includes a high priority designation and the predefined characteristic is any available connection also having a lowest latency if a plurality of connections are available.

5. The system of claim 3, wherein the priority designation includes a medium priority designation and the predefined characteristic is any available connection also having a highest bandwidth if a plurality of connections are available.

6. The system of claim 3, wherein the priority designation includes a low priority designation and the predefined characteristic is any available connection for which transfer costs for handling the request will not exceed a predefined maximum cost, also having a highest bandwidth if a plurality of connections, for which transfer costs for handling the request will not exceed a predefined maximum cost, are available.

7. The system of claim 3, wherein the priority designation includes a free-only designation and the predefined characteristic is any available connection for which there are no transfer costs for handling the request.

8. The system of claim 7, wherein the request also includes an expiration designation, wherein the processor is configured to redesignate a free-only designated request to be handled by a non-free available connection if an amount of time defined by the expiration designation passes and the request has not yet been handled.

9. The system of claim 3, wherein the connection includes a cellular connection.

10. The system of claim 3, wherein the connection includes a Wi-Fi connection.

11. The system of claim 3, wherein the connection includes a BLUETOOTH connection.

12. A system comprising:
a processor configured to:
receive a data transfer request including a free-only designation and an expiration designation;
determine whether a wireless connection, having free data transfer, becomes available for use in handling the request during a time period defined by the expiration designation;
handle the request using the connection, if the connection becomes available; and
redesignate the request as a non-free request, to be handled by a non-free available connection, once an amount of time defined by the expiration designation passes and the request has not yet been handled.

* * * * *